United States Patent
Cherubini et al.

(10) Patent No.: US 8,643,975 B2
(45) Date of Patent: Feb. 4, 2014

(54) METHOD AND APPARATUS FOR OPERATING A STORAGE DEVICE

(75) Inventors: Giovanni Cherubini, Rueschlikon (CH); Jens Jelitto, Rueschlikon (CH); Angeliki Pantazi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/517,434

(22) PCT Filed: Dec. 17, 2010

(86) PCT No.: PCT/IB2010/055909
§ 371 (c)(1),
(2), (4) Date: Jun. 20, 2012

(87) PCT Pub. No.: WO2011/077340
PCT Pub. Date: Jun. 30, 2011

(65) Prior Publication Data
US 2012/0268842 A1 Oct. 25, 2012

(30) Foreign Application Priority Data
Dec. 21, 2009 (EP) .................................. 09180118

(51) Int. Cl.
*G11B 20/20* (2006.01)
(52) U.S. Cl.
USPC .......................................................... 360/76
(58) Field of Classification Search
None
See application file for complete search history.

(56) References Cited

U.S. PATENT DOCUMENTS

| | | |
|---|---|---|
| 6,430,008 B1 * | 8/2002 | Trabert et al. ............... 360/317 |
| 6,724,559 B1 | 4/2004 | Konishi et al. |
| 2006/0103968 A1 | 5/2006 | Jurneke |

FOREIGN PATENT DOCUMENTS

EP 0617412 A2 9/1994

OTHER PUBLICATIONS

Borm, D. S., "Tape Drive Motor Alignment Apparatus," Technical Disclosure Bulletin (1969), vol. 11, No. 9, pp. 1146-1147.
International Search Report dated May 16, 2011 issued in PCT/IB2010/055909.

* cited by examiner

*Primary Examiner* — K. Wong
(74) *Attorney, Agent, or Firm* — Scully, Scott, Murphy & Presser, P.C.; Gail H. Zarick, Esq.

(57) ABSTRACT

Method for operating a storage device with a tape and a head which is operable to read and/or write data from and respectively to the tape. The tape is moveable in a predetermined longitudinal direction. At least two consecutive current lateral tape positions of the tape with respect to a predetermined reference point are determined at a predetermined longitudinal capture position. A tape skew of the tape is determined dependent on the at least two determined lateral positions. The tape skew represents an angle between a current tape motion direction of the tape and the longitudinal direction. A skew control signal is determined dependent on the determined tape skew. A rotational head position of the head is controlled dependent on the skew control signal to align the head to the current tape motion direction in such a way that the head is operable to read and/or write data.

14 Claims, 3 Drawing Sheets

$$A\overset{\triangle}{B}\Gamma: \quad \sin\theta = \frac{d_{B\Gamma}}{d_{AB}} = \frac{y_x(t_2) - y_x(t_1)}{v \cdot \Delta t} \qquad \text{(F0)}$$

$$d_y \approx (1 + P_{yy} \cdot K_y) \cdot PES \qquad \text{(F2)}$$

$$P = \begin{bmatrix} P_{yy} & P_{y\vartheta} \\ P_{\vartheta y} & P_{\vartheta\vartheta} \end{bmatrix} \qquad \text{(F4)}$$

METHOD AND APPARATUS FOR OPERATING A STORAGE DEVICE

CROSS-REFERENCE TO RELATED APPLICATIONS

The present invention relates to and claims the benefit of the filing date of commonly-owned, PCT Patent Application No. PCT/IB2010/055909, filed Dec. 17, 2010, which further claims the benefit of priority date of commonly-owned, European Patent Application No. EP 09180118.3, filed on Dec. 21, 2009, the entire contents and disclosure of which is incorporated by reference as if fully set forth herein.

TECHNICAL FIELD

The present invention relates to a method and an apparatus for operating a storage device which comprises a tape and a head.

BACKGROUND OF THE INVENTION

EP 0549848 A1 discloses a detection of an edge of a tape and further a control of the read/write head to position itself to the detected edge. An array of photo detectors in an integrated circuit chip senses the intensity of light illuminating the chip with the tape running between a light source and the photo detectors.

US 2006/0103968 A1 discloses that with increasing storage densities on a given storage medium cartridge size the bits on the medium may be written to smaller areas and on a plurality of parallel longitudinal tracks. In this context, a system for positioning a transducer head to a storage medium. A first and a second sensor are associated to the head to be used for adjusting an azimuth position of the head. The first and the second sensor are positioned on opposite sides of the head along a direction of storage medium transport. The azimuth position of the head is adjusted in response to medium positions sensed by the first and the second sensor.

Consequently, it is a challenge to provide a method and an apparatus for operating a storage device which enable a reliable positioning of the head.

SUMMARY OF THE INVENTION

According to a first and second aspect of the invention, a method and a corresponding apparatus for operating a storage device with a tape and a head are disclosed. The head is operable to read and/or write data from and respectively to the tape. The tape is moveable in a predetermined longitudinal direction. Within the scope of a tape skew estimation at least two consecutive current lateral tape positions of the tape with respect to a predetermined reference point are determined at a predetermined longitudinal capture position. A tape skew of the tape is determined dependent on the at least two determined lateral positions. The tape skew represents an angle between a current tape motion direction of the tape and the longitudinal direction. A skew control signal is determined dependent on the determined tape skew. A rotational head position of the head is controlled dependent on the skew control signal to align the head to the current tape motion direction in such a way that the head is operable to read and/or write data.

This enables an improved track-follow control especially in the case of low frequency lateral disturbances like for example stack shifts. In this context, track-follow control comprises the controlling of lateral and rotational head position, thereby moving and rotating the head such that it follows a centerline of data tracks as accurately as possible for example during read/write operations.

The longitudinal direction and a predetermined lateral direction serve as reference directions. Both directions are preferably perpendicular to each other. In this context, the term "lateral" corresponds to the lateral direction and the term "longitudinal" corresponds to the longitudinal direction.

The tape may be supplied by for example a supply-reel and may be taken up by a take-up reel. The tape transport is triggered by actuating at least the take-up reel to move the tape in a predetermined tape transport direction. The tape motion direction mainly comprises motion components in longitudinal direction but may also comprise motion components in lateral direction which can be identified as tape lateral motion. The tape lateral motion may for example result from debris accumulation on flanged rollers or from unevenly reeling or unreeling of the tape and may represent for example sudden lateral displacements of the tape.

By using flangeless rollers in a tape path of the storage device, there is no tight constraint on the motion of the tape and lateral tape motion effects are more pronounced. In a flangeless drive the amplitude of these disturbances is higher compared to a drive with flanged rollers. The increased amplitude of the lateral tape motion creates typically large tape to head skew and degrades the performance of the system. Stack shifts appear as a sudden lateral displacement repeated at the same longitudinal position each time the tape is running.

The at least two consecutive lateral tape positions are determined on one predetermined longitudinal capture position. The longitudinal capture position represents a position at the tape path.

The head need to be for example perpendicularly aligned to the tape motion direction to facilitate the reading and/or writing of data.

In a preferred embodiment of the first and second aspect of the invention, at least one tilting element of the storage device is controlled dependent on the skew control signal to align the tape motion direction of the tape to the head in such a way that the head is operable to read and/or write data. The tilting of the tape may be realized by using tilting elements, such as tape rollers being for example operable to tilt in longitudinal direction dependent on the skew control signal. The tilting of the tape may be used in combination with the rotation of the head.

According to a third and fourth aspect of the invention, a method and a corresponding apparatus for operating a storage device with at least one tilting element and a tape and a head are disclosed. The head is operable to read and/or write data from and respectively to the tape, wherein the tape is moveable in a predetermined longitudinal direction. Within the scope of a tape skew estimation at least two consecutive current lateral tape positions of the tape with respect to a predetermined reference point are determined at a predetermined longitudinal capture position. A tape skew of the tape is determined dependent on the at least two determined lateral positions. The tape skew represents an angle between a current tape motion direction of the tape and the longitudinal direction. A skew control signal is determined dependent on the determined tape skew. The at least one tilting element is controlled dependent on the skew control signal to align the tape motion direction of the tape to the head in such a way that the head is operable to read and/or write data. This enables an improved track-follow control especially in the case of low frequency lateral disturbances like for example stack shifts. The tilting elements may for example be tape rollers being in contact with the tape and are operable to tilt the tape for example in longitudinal direction dependent on the skew control signal. The tilting of the tape may be used in combination with the rotation of the head In a preferred embodiment of the preceding aspects of the invention, at least one tape edge of the tape is observed. The at least two consecutive lateral tape positions are determined dependent on the at least one observed tape edge. This facilitates a reliable determination of the current lateral tape position. The tape edge observation is preferably established by using optical sensors.

In a further preferred embodiment of the preceding aspects of the invention, a predetermined position error signal is observed which represents a lateral distance between the head and a predetermined reference position on a particular servo pattern of predetermined servo patterns which are stored on the tape along a longitudinal expansion of the tape. The at least two consecutive lateral tape positions are determined dependent on the observation of the predetermined position error signal. The position error signal is typically provided by the head. This has the advantage, that no external sensors are used to facilitate the compensation of the tape skew. The particular servo pattern represents for example written servo stripes and is preferably written to the tape during tape manufacturing.

In a further preferred embodiment of the preceding aspects of the invention, the at least two consecutive lateral tape positions are determined dependent on a predetermined model of an actuator upon which the position error signal is applied. The actuator is operable to at least control a lateral head position of the head. This facilitates the determination of the at least two consecutive lateral tape positions dependent on the position error signal, which is for example captured from a closed-loop control system.

In a further preferred embodiment of the preceding aspects of the invention, a tape transport direction of the tape in the longitudinal direction is determined The longitudinal capture position is determined dependent on the tape transport direction in such a way that the tape at first passes the longitudinal capture position and subsequently the head and/or the at least one tilting element. Lateral disturbances, originated at a specific location on the tape path typically propagate through the tape path from one point to the other. The lateral tape position determined by for example the sensor positioned prior the head and/or the at least one tilting element at the longitudinal capture position with respect to the tape transport direction will appear at the head location or the longitudinal position of the tilting element with a time delay dependent on a tape velocity and a longitudinal distance between the longitudinal capture position and the longitudinal head position or the longitudinal position of the particular tilting element. This facilitates a good estimation of the lateral tape motion at the longitudinal head position and/or the longitudinal position of the particular tilting element.

In a further preferred embodiment of the preceding aspects of the invention, the tape skew estimation is executed cyclically. This facilitates the compensation of the skew during an operation of the storage device.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION OF THE DRAWINGS

Figure 1:
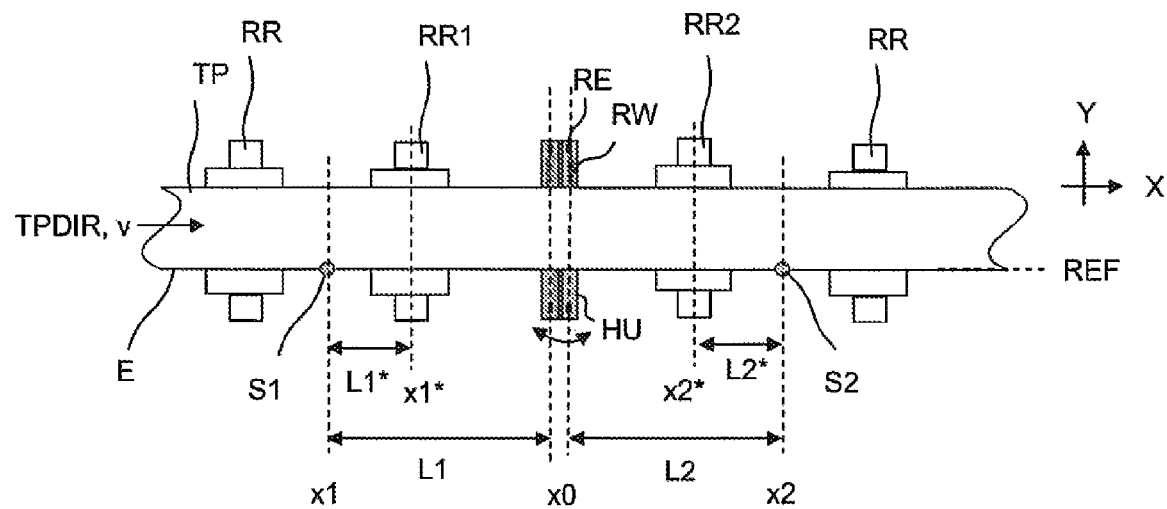
FIG. 1, an exemplary illustration of a tape path.

FIG. 1 shows a tape path of a storage device, as for example a tape drive, in a schematical view. A head HU, for example a magnetic head, and tape rollers RR, RR1, RR2, as for example flangeless rollers, are associated to the tape path. The head HU comprises at least a first and a second head module HM1, HM2. Each head module HM1, HM2 comprises at least one head element RW and at least one servo read element RE. Each head element RW is operable to read or write data from and respectively to a tape TP and may by way of example be a read or write transducer.

Figure 3:
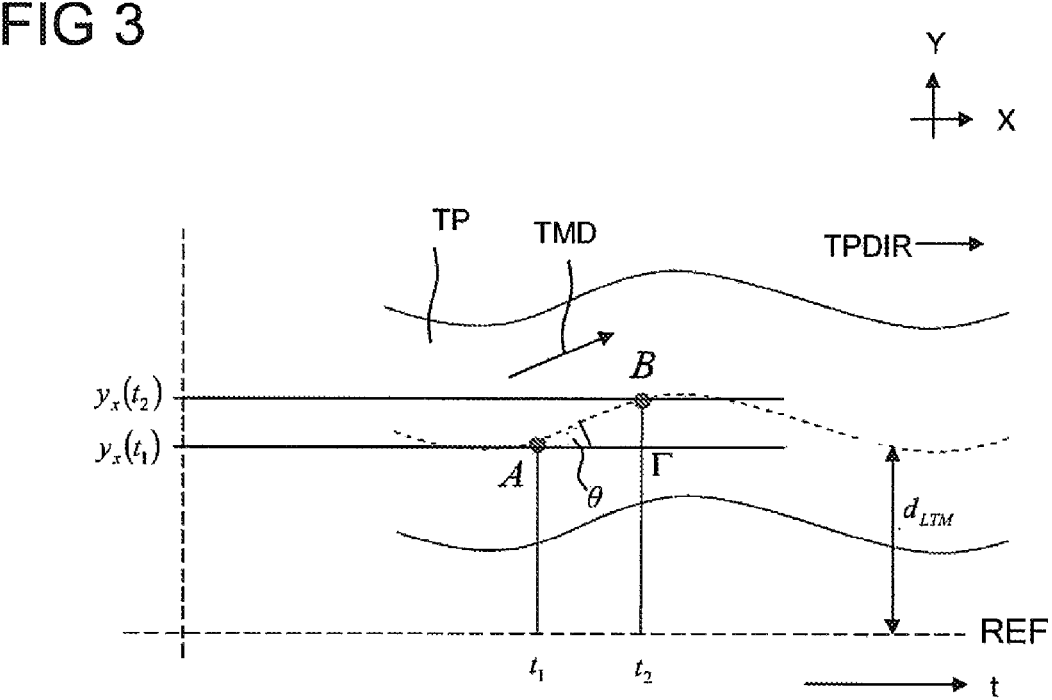
FIG. 3, an illustration of the head and the tape.

The tape TP may for example comprise at least one servo pattern SP (FIG. 3). The particular servo pattern SP is part or associated to data tracks of the tape TP which represent a tape area where actual data is stored and/or to be written to. Each servo read element RE is operable to detect and/or read the servo pattern SP. A predetermined selection of servo read elements RE is preferably associated to the servo pattern SP.

The storage device preferably comprises an actuator PU which is operable to control a lateral head position y of the head HU in a lateral direction Y dependent on a predetermined position control signal $u_y$. The actuator PU may also be operable to control a rotational head position v of the head HU (FIG. 4) in a plane predetermined by the longitudinal direction X and the lateral direction Y dependent on a predetermined skew control signal $u_v$.

Furthermore, a first and a second tape roller RR1, RR2 are positioned next to the head HU on opposite sides of the head HU in longitudinal direction X. The first and the second tape roller RR1, RR2 are directly in contact with the tape TP and are operable to actively tilt the tape TP dependent on the predetermined skew control signal $u_v$. For that purpose, the first and second tape roller RR1, RR2 may be operable to tilt in longitudinal direction x. The first and second tape roller RR1, RR2 are also identified as tilting elements. The storage device may comprise the actuator PU being operable to control the rotational position v of the tape TP and/or at least one tilting element being operable to tilt the tape TP.

The tape TP may move in a forward direction along a longitudinal direction X as shown in FIG. 1. The forward direction represents a tape transport direction TPDIR along the longitudinal direction X where the tape TP at first passes for example the first head module HM1 and subsequently the second head module HM2. A reverse direction of the tape TP is reversed with respect to the forward direction.

A first sensor S1 at a first longitudinal position x1 and a second sensor S2 at a second longitudinal position x2 are associated to the tape path as shown in FIG. 1. Both sensors S1, S2 may be optical sensors, as for example light barriers, photo detectors or an array of photo detectors. The first and the second sensor S1, S2 are positioned on opposite sides of the head HU with respect to the longitudinal direction X. Furthermore, the first sensor Si and the second sensor S2 are positioned on opposite sides of the first and the second tape roller RR2, RR1. A first longitudinal distance L1 represents a distance between the first longitudinal position x1 and the head HU. A second longitudinal distance L2 represents a distance between the second longitudinal position x2 and the head HU. A further first longitudinal distance L1* represents a distance between the first longitudinal position x1 and a further first longitudinal position x1* of the first tape roller RR1. A further second longitudinal distance L2* represents a distance between the second longitudinal position x2 and a further second longitudinal position x2* of the second tape roller RR2. Each sensor S1, S2 is preferably operable to observe a tape edge E. The first sensor S1 is further operable to provide a first output sensor signal dependent on the observed tape edge E. The first output sensor signal represents a first lateral tape position $y_{x1}(t)$ with respect to a predetermined reference point REF at the first longitudinal position x1. The second sensor S2 is operable to provide a second output sensor signal dependent on the observed tape edge E. The second output sensor signal represents a second lateral tape position $y_{x2}(t)$ with respect to a predetermined reference point REF at the second longitudinal position x2. The reference point REF may by way of example be a lateral position of the first and second sensor S1, S2. The first longitudinal position x1 and the second longitudinal position x2 are also identified as longitudinal capture positions.

Figure 2:
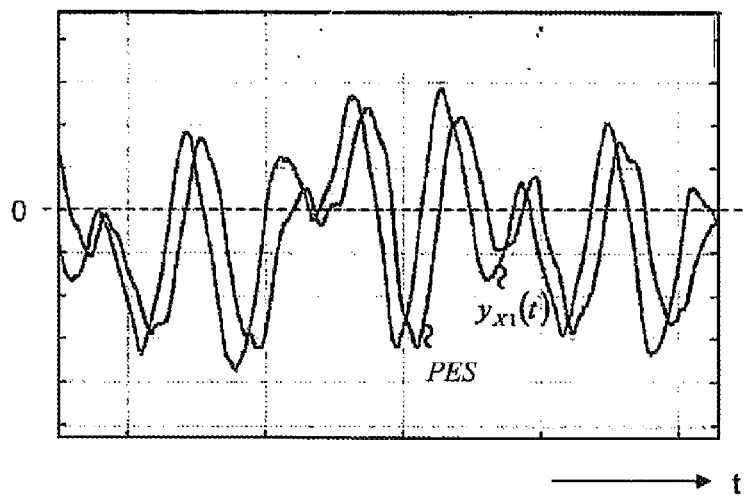
FIG. 2, a diagram.

FIG. 2 shows a diagram representing the lateral tape motion versus time t. A waveform of the first lateral tape position $y_{x1}(t)$ and a position error signal PES versus the time t is shown. The first lateral tape position $y_{x2}(t)$ is for example provided by the first sensor S1 at the first longitudinal position x1. The first lateral tape position $y_{x1}(t)$ and the position error signal PES vary over time t due to lateral tape motion introduced by lateral disturbances as for example stack shifts. Due to the lateral tape motion of the tape TP, a resulting tape motion direction TMD (see also FIG. 3) may also comprise motion components in lateral direction Y. A tape skew $\theta$ represents an angle between the resulting tape motion direction TMD and the longitudinal direction X (see also FIG. 3).

Figure 4:
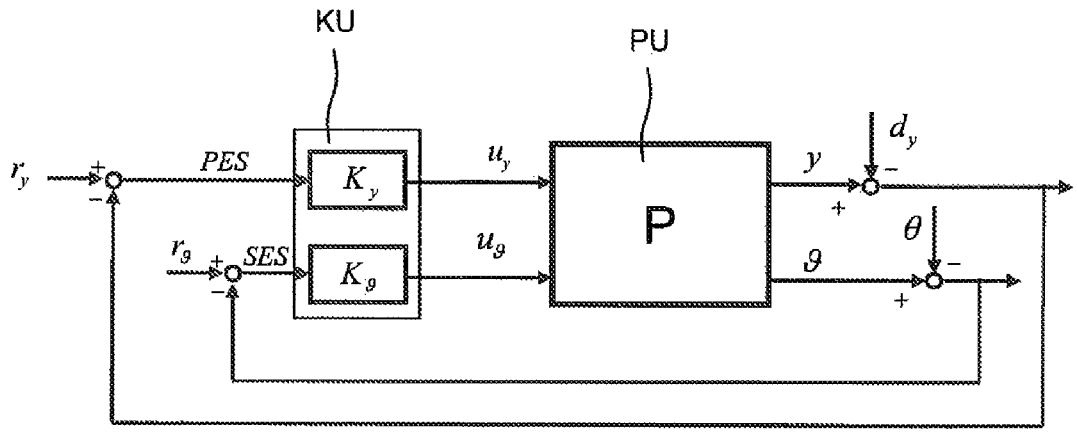
FIG. 4, an illustration of a control system.

The position error signal PES is preferably provided by the head HU and preferably controlled by a control system (FIG. 4). The position error signal PES represents a lateral distance between a current lateral head position y and a predetermined reference position $r_y$ on a particular servo pattern at the longitudinal head position x0. In the diagram in FIG. 2, the waveform of the position error signal PES represents a position error signal captured in an open-loop configuration of the control system according to FIG. 4. The open-loop configuration of the control system is for example given if the head HU is fixedly set to a predetermined lateral head position y, as for example the reference point REF.

As can be seen in FIG. 2 the waveform of the first lateral tape position $y_{x1}(t)$ runs prior to the waveform of the position error signal PES, by this indicating the forward direction of the moving tape TP. The time lag between the waveform of the first 10 lateral tape position $y_{x1}(t)$ and the waveform of the position error signal PES correlates to a time period in which a predetermined point of the tape TP passes the first longitudinal distance L1 with a predetermined tape velocity v. The first lateral tape position $y_{x1}(t)$ facilitates an estimation of the lateral tape position at the longitudinal head position x0.

FIG. 3 shows the tape TP moving in forward direction with the predetermined tape velocity v. At a first point of time $t_1$, a lateral tape position $y_x(t_1)$ is determined at a predetermined longitudinal capture position, as for example by the first sensor S1 at the first longitudinal position x1. At a second point of time $t_2$ a further lateral tape position $y_x(t_2)$ is determined at the same predetermined longitudinal capture position. In reverse direction, the lateral tape positions $y_x(t_1)$, $y_x(t_2)$ may for example be determined by the second sensor S2 at the second longitudinal position x2.

Alternatively or additionally, both lateral tape positions $y_x(t_1)$, $y_x(t_2)$ may be derived from particular lateral positions $d_y$ derived from the position error signal PES. The particular lateral position $d_y$ represents a corresponding lateral tape position. As already mentioned, the position error signal PES is typically incorporated in a track-follow control of the lateral head position y of the head HU. The track-follow control may be realized in a closed-loop control system as shown in FIG. 4. By this, typically only a closed-loop captured position error signal PES is available which typically does not offer the possibility to directly derive the particular lateral position $d_y$. However, the lateral position $d_y$ may be derived from a predetermined first parameter $P_{yy}$ of a model P of an actuator PU and a predetermined controller gain $K_y$ of a controller KU as shown in equation F2 in FIG. 4.

In this context, the lateral tape position $y_x(t_1)$ may be derived from the lateral position $d_y$ determined at the first point of time $t_1$ and the further lateral tape position $y_x(t_2)$ may be derived from a lateral position $d_y$ determined at the second point of time $t_2$. The lateral position $d_y$ determined at the first point of time $t_1$ may for example be equal to the lateral tape position $y_x(t_1)$. The lateral position $d_y$ determined at the second point of time $t_2$ may for example be equal to the second lateral tape position $y_x(t_2)$. Both lateral tape positions $y^x(t_1)$, $y^x(t_2)$ represent two determined consecutive lateral tape positions.

The tape skew $\theta$ may be derived by using equation F0 in FIG. 3 which represents a trigonometrical relation of triangle $\stackrel{\Delta}{ABT}$. A first triangle side $d_{BT}$ represents the lateral distance between both determined lateral tape positions $y_x(t_1)$, $y^x(t_2)$. A second triangle side $d_{AB}$ represents a distance in tape motion direction TMD which results from the current tape velocity v and a time difference $\Delta t$. The time difference $\Delta t$ represents a time lag between the first and the second point of time $t_1$, $t_2$.

According to FIG. 4 the actuator PU of the control system is operable to at least laterally move the head HU dependent on a predetermined position control signal $u_y$. The actual lateral position of the head HU is represented by the lateral head position y. The position control signal $u_y$ is provided by the controller KU dependent on the predetermined controller gain $K_y$ and the position error signal PES. The position error signal PES is derived from a difference of the lateral position $d_y$ and the lateral head position y and the reference position $r_y$ on the particular servo pattern.

Additionally, the actuator PU may be operable to rotationally move the head HU dependent on the skew control signal $u_v$. The actual rotational position of the head HU is represented by the rotational head position v. The skew control signal $u_v$ is provided by the controller KU dependent on a further predetermined controller gain $K_v$ and a skew error signal SES. The skew error signal SES is derived from a difference of the current tape skew $\theta$ and the rotation head position v and a predetermined reference skew value $r_v$.

Beside the controller KU, the control system may comprise a separate controller which provides the skew control signal $u_v$ dependent on the skew error signal SES.

Alternatively or additionally, the skew control signal $u_v$ may be provided to the tilting elements as for example to the first and second tape roller RR1, RR2 to tilt the tape TP accordingly.

The equation F2 in FIG. 4 refers to the control system shown in FIG. 4. The model P of the actuator may for example be a 2×2 matrix as shown in equation F4 in FIG. 4. By this, the actuator model P represents a two inputs and two outputs system. The first parameter $P_{yy}$ models a relation between the lateral head position y and the position control signal $u_y$. A second parameter $P_{vv}$ models a relation between the rotational head position v and the predetermined skew control signal $u_v$. The remaining parameters $P_{yv}$, $P_{vy}$ represent a cross-coupling between lateral head position y and predetermined skew control signal $u_v$ and a cross-coupling between the rotational head position v and the predetermined position control signal $u_y$.

Figure 5:
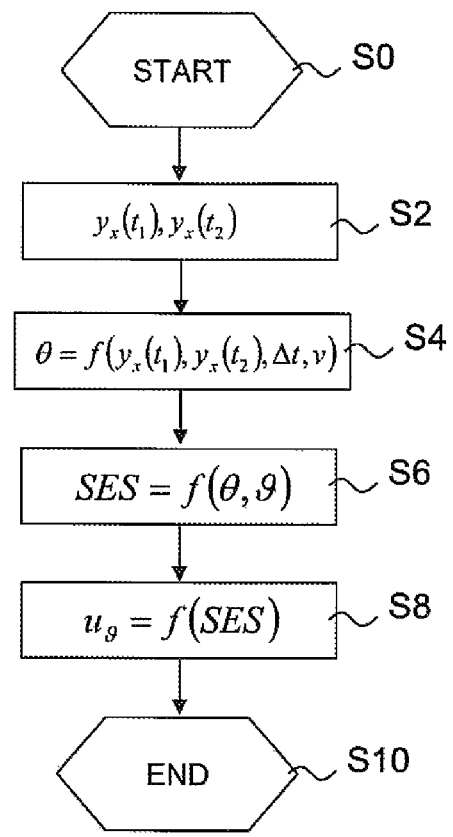
FIG. 5, a flow chart.

A program according to the flow chart of FIG. 5 is for example executed by a controller unit of the storage device, as for example a microcontroller. The controller unit may also be identified as an apparatus for operating the storage device. The program in FIG. 5 represents a tape skew estimation.

The execution of the program starts in a step S0. In a step S2, the two consecutive lateral tape positions $y_x(t_1)$, $y_x(t_2)$ are determined. Additionally, further lateral tape positions may be determined The at least two lateral tape positions $y_x(t_1)$, $y_x(t_2)$ may be derived from the position error signal PES, for example by using the actuator model P and the predetermined controller gain $K_y$. Alternatively or additionally, the at least two lateral tape positions $y_x(t_1)$, $y_x(t_2)$ may be estimated dependent on the first or second lateral tape position $y^{x1}(t)$, $y_{x2}(t)$ provided by the first or second sensor S1, S2 dependent on the tape transport direction TPDIR.

In a step S4, the tape skew θ is for example determined dependent on the at least two lateral tape positions $y_x(t_1)$, $y_x(t_2)$ and the current tape velocity v and the time difference Δt. The tape skew θ may be determined by using equation F0 in FIG. 3 and calculating its arc sinus.

In a step S6, the skew error signal SES is determined dependent on the determined tape skew θ and the current rotational head position v of the head HU.

In a step S8, the skew control signal $u_v$ is determined dependent on the skew error signal SES. The rotational head position v of the head HU is controlled by the actuator P and/or the tilting elements dependent on the determined skew control signal $u_v$ to align the head HU to the current tape motion direction TMD in such a way that the head HU is operable to read and/or write data. The execution of the software program stops in step S10. Preferably, the program execution and by this, the tape skew estimation restarts in step S2.

Although the invention has been described through some exemplary embodiments, the invention is not limited to such embodiments. It is apparent that those skilled in the art can make various modifications and variations to the present invention without departing from the scope of the present invention. The present invention is intended to cover these modifications and variations provided that they fall in the scope of protection defined by the following claims or their equivalents.

LIST OF REFERENCES $\hat{AB\Gamma}$ triangle
θ tape skew
v rotational head position
$u_{84}$ skew control signal
$u_y$ position control signal
$r_y$ reference position
$r_v$ reference skew value
$d_y$ lateral position
$d_{AB}$, $d_{B\Gamma}$ triangle sides
$y_{x1}(t)$, $y_x(t)$, lateral tape positions
$y_x(t_1)$, $y_x(t_2)$
$P_{yy}$, $P_{yv}$, $P_{vy}$, parameters of actuator model
$P_{vv}$
E tape edge
HU head
L1, L2, L1*, longitudinal distance
L2*
P actuator model
PES position error signal
PU head acutator
RE servo read element
REF reference point
RR, RR1, RR2 tape rollers
RW head element
S1, S2 sensor
SES skew error signal
t, $t_1$, $t_2$ time
TMD tape motion direction
TP tape
TPDIR tape transport direction
v tape velocity
X longitudinal direction
x0 longitudinal head position
x1, x2, x1*, x2* longitudinal positions
y lateral head position
Y lateral direction

The invention claimed is:

1. A method for operating a storage device having a tape (TP) and a head (HU) which is operable to read and/or write data from and respectively to the tape (TP), wherein the tape (TP) is moveable in a predetermined longitudinal direction (X), said method comprising:
    determining, within the scope of a tape skew estimation, at least two consecutive current lateral tape positions ($y_x(t_1)$, $y_x(t_2)$) of the tape (TP) with respect to a predetermined reference point (REF) at a predetermined longitudinal capture position,
    determining a tape skew (θ) of the tape (TP) dependent on the at least two determined lateral positions ($y_x(t_1)$, $y_x(t_2)$), wherein the tape skew (θ) represents an angle between a current tape motion direction (TMD) of the tape (TP) and the longitudinal direction (X),
    determining a skew control signal ($u_v$) dependent on the determined tape skew (θ), and
    controlling a rotational head position (v) of the head (HU) dependent on the skew control signal ($u_v$)to align the head (HU) to the current tape motion direction (TMD) in such a way that the head (HU) is operable to read and/or write data.

2. The method according to claim 1, wherein at least one tilting element of the storage device is controlled dependent on the skew control signal ($u_v$) to align the tape motion direction (TMD) of the tape (TP) to the head (HU) in such a way that the head (HU) is operable to read and/or write data.

3. A method for operating a storage device having at least one tilting element, a tape (TP) and a head (HU) which is operable to read and/or write data from and respectively to the tape (TP), wherein the tape (TP) is moveable in a predetermined longitudinal direction (X), said method comprising:
    determining, within the scope of a tape skew estimation, at least two consecutive current lateral tape positions ($y_x(t_1)$, $y_x(t_2)$) of the tape (TP) with respect to a predetermined reference point (REF) at a predetermined longitudinal capture position,
    determining a tape skew (θ) of the tape (TP) dependent on the at least two determined lateral positions ($y_x(t_1)$, $y_x(t_2)$), wherein the tape skew (θ) represents an angle between a current tape motion direction (TMD) of the tape (TP) and the longitudinal direction (X),
    determining a skew control signal ($u_v$) dependent on the determined tape skew (θ), and controlling the at least one tilting element dependent on the skew control signal ($u_v$) to align the tape motion direction (TMD) of the tape (TP) to the head (HU) in such a way that the head (HU) is operable to read and/or write data.

4. The method according to claim 3, wherein a rotational head position (v) of the head (HU) is controlled dependent on the skew control signal ($u_v$) to align the head (HU) to the current tape motion direction (TMD) in such a way that the head (HU) is operable to read and/or write data.

5. The method according to claim 4, further comprising:
observing at least one tape edge (E) of the tape (TP),
determining the at least two consecutive lateral tape positions ($y_x(t_1)$, $y_x(t_2)$) dependent on the at least one observed tape edge (E).

6. The method according to claim 5, wherein the at least one tape edge (E) is observed by using at least one optical sensors.

7. The method according to claim 6, further comprising:
observing a predetermined position error signal (PES), which represents a lateral distance between the head (HU) and a predetermined reference position ($r_y$) on a particular servo pattern (SP) of predetermined servo patterns which are stored on the tape (TP) along a longitudinal expansion of the tape (TP),
determining the at least two consecutive lateral tape positions ($y_x(t_1)$, $y_x(t_2)$) dependent on the observation of the predetermined position error signal (PES).

8. The method according to claim 7, wherein the at least two consecutive lateral tape positions ($y_x(t_1)$, $y_x(t_2)$) are determined dependent on a predetermined model (P) of an actuator (PU) upon which the position error signal (PES) is applied, wherein the actuator (PU) is operable to at least control a lateral head position (y) of the head (HU).

9. The method according to claim 8, further comprising:
determining a tape transport direction (TPDIR) of the tape (TP) in the longitudinal direction (X),
determining the longitudinal capture position dependent on the tape transport direction (TPDIR) in such a way that the tape (TP) at first passes the longitudinal capture position and subsequently the head (HU).

10. The method according to claim 2, further comprising:
determining a tape transport direction (TPDIR) of the tape (TP) in the longitudinal direction (X),
determining the longitudinal capture position dependent on the tape transport direction in such a way that the tape (TP) at first passes the longitudinal capture position and subsequently the at least one tilting element.

11. The method according to claim 2, further comprising:
determining a current tape velocity (v) of the tape (TP) in longitudinal direction (X),
determining the tape skew ($\theta$) dependent on the determined tape velocity (v).

12. The method according to claim 2, wherein the tape skew estimation is executed cyclically.

13. An apparatus for operating a storage device with a tape (TP) and a head (HU) which is operable to read and/or write data from and respectively to the tape (TP), wherein the tape (TP) is moveable in a predetermined longitudinal direction (X), wherein within the scope of a tape skew estimation the apparatus is operable
to determine at least two consecutive current lateral tape positions ($y_x(t_1)$, $y_x(t_2)$) of the tape (TP) with respect to a predetermined reference point (REF) at a predetermined longitudinal capture position,
to determine a tape skew ($\theta$) of the tape (TP) dependent on the at least two determined lateral positions ($y_x(t_1)$, $y_x(t_2)$), wherein the tape skew ($\theta$) represents an angle between a current tape motion direction (TMD) of the tape (TP) and the longitudinal direction (X),
to determine a skew control signal ($u_v$) dependent on the determined tape skew ($\theta$), and
to control a rotational head position of the head (HU) dependent on the skew control signal ($u_v$) to align the head (HU) to the current tape motion direction (TMD) in such a way that the head (HU) is operable to read and/or write data.

14. An apparatus for operating a storage device with at least one tilting element, a tape (TP) and a head (HU) which is operable to read and/or write data from and respectively to the tape (TP), wherein the tape (TP) is moveable in a predetermined longitudinal direction (X), wherein within the scope of a tape skew estimation the apparatus is operable
to determine at least two consecutive current lateral tape positions ($y_x(t_1)$, $y_x(t_2)$) of the tape (TP) with respect to a predetermined reference point (REF) at a predetermined longitudinal capture position,
to determine a tape skew ($\theta$) of the tape (TP) dependent on the at least two determined lateral positions ($y_x(t_1)$, $y_x(t_2)$), wherein the tape skew ($\theta$) represents an angle between a current tape motion direction (TMD) of the tape (TP) and the longitudinal direction (X),
to determine a skew control signal ($u_v$) dependent on the determined tape skew ($\theta$), and
to control the at least one tilting element dependent on the skew control signal ($u_v$) to align the tape motion direction (TMD) of the tape (TP) to the head (HU) in such a way that the head (HU) is operable to read and/or write data.

* * * * *